March 1, 1960 D. W. WOODWARD ET AL 2,927,019
PHOTOGRAPHIC ELEMENTS AND PROCESSES OF PHOTOGRAPHY
Filed Nov. 12, 1954 13 Sheets-Sheet 7
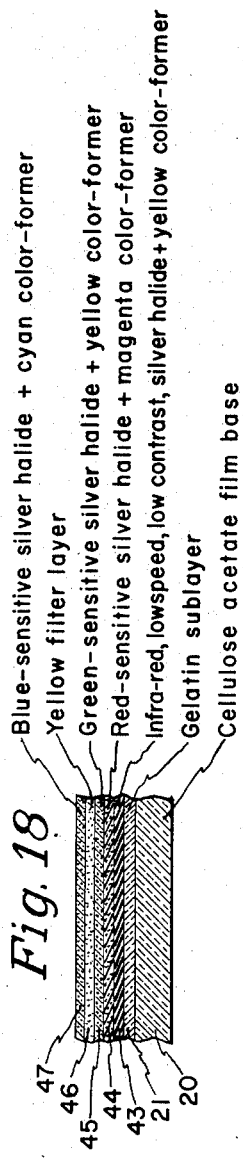
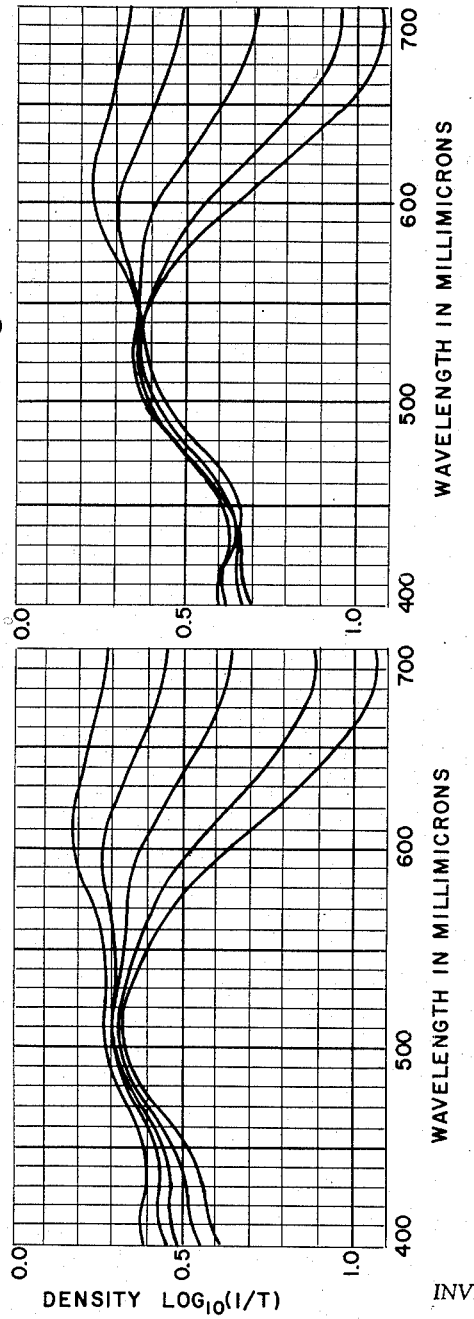
INVENTORS
DAVID WILLCOX WOODWARD
VICTOR FU HUA CHU
BY Lynn Barratt Morris
ATTORNEY

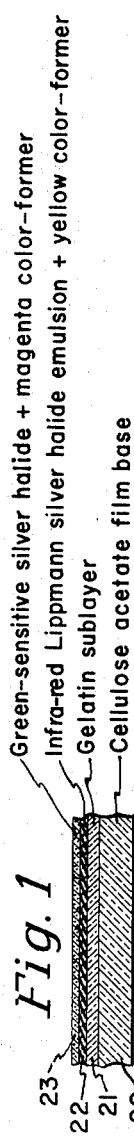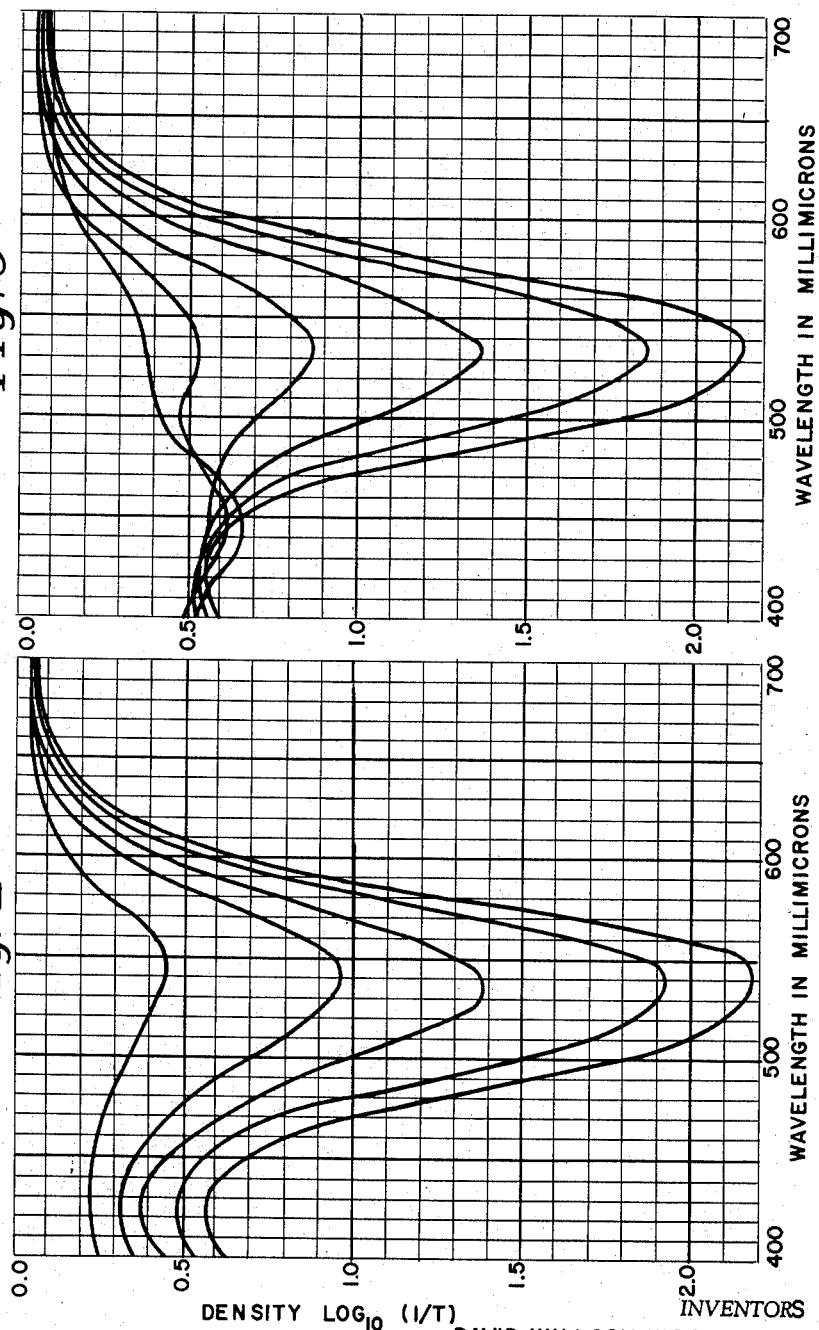

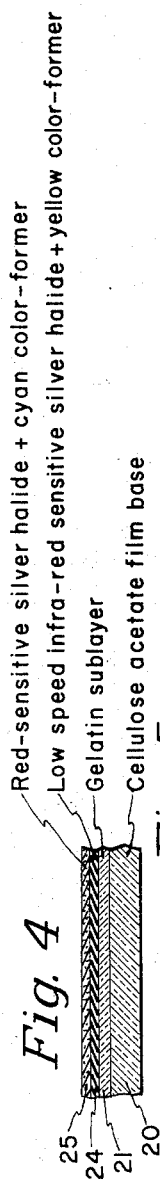
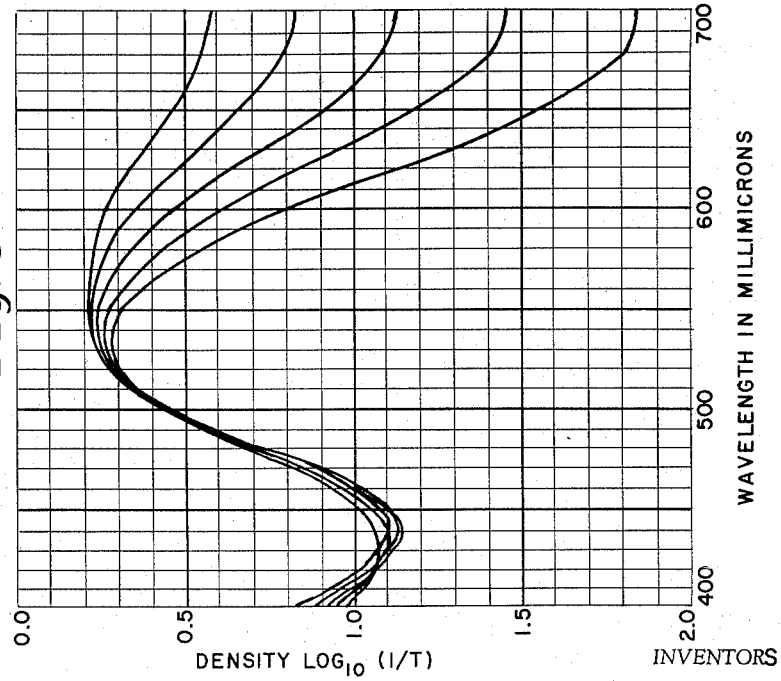

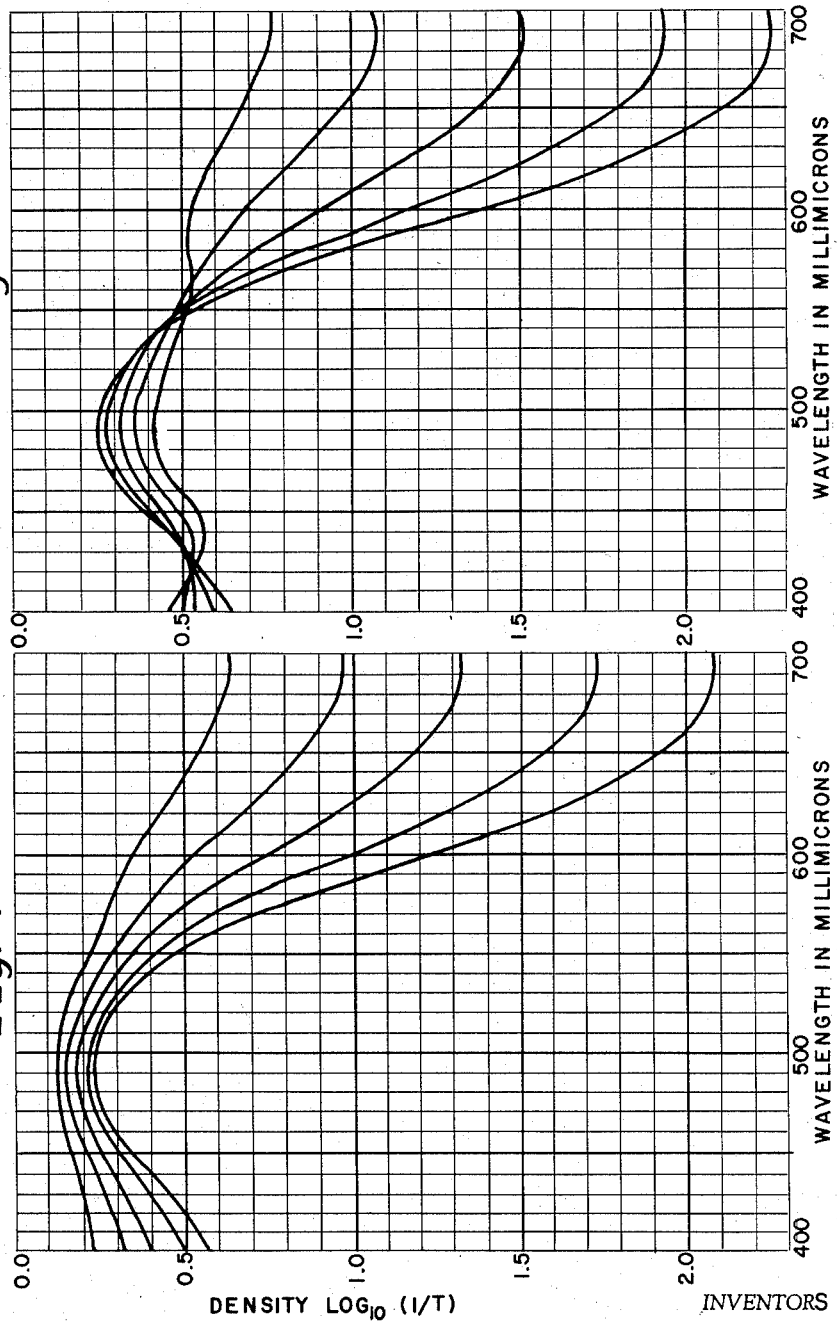

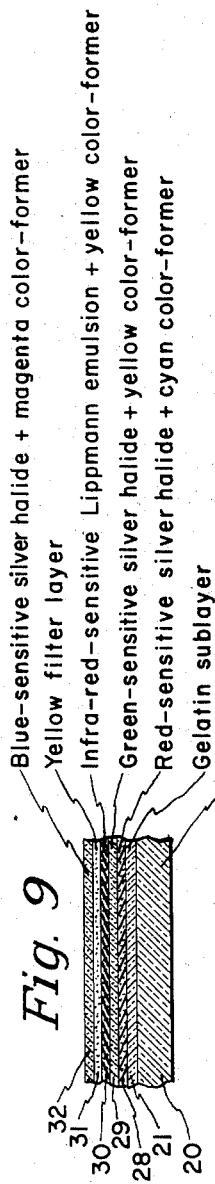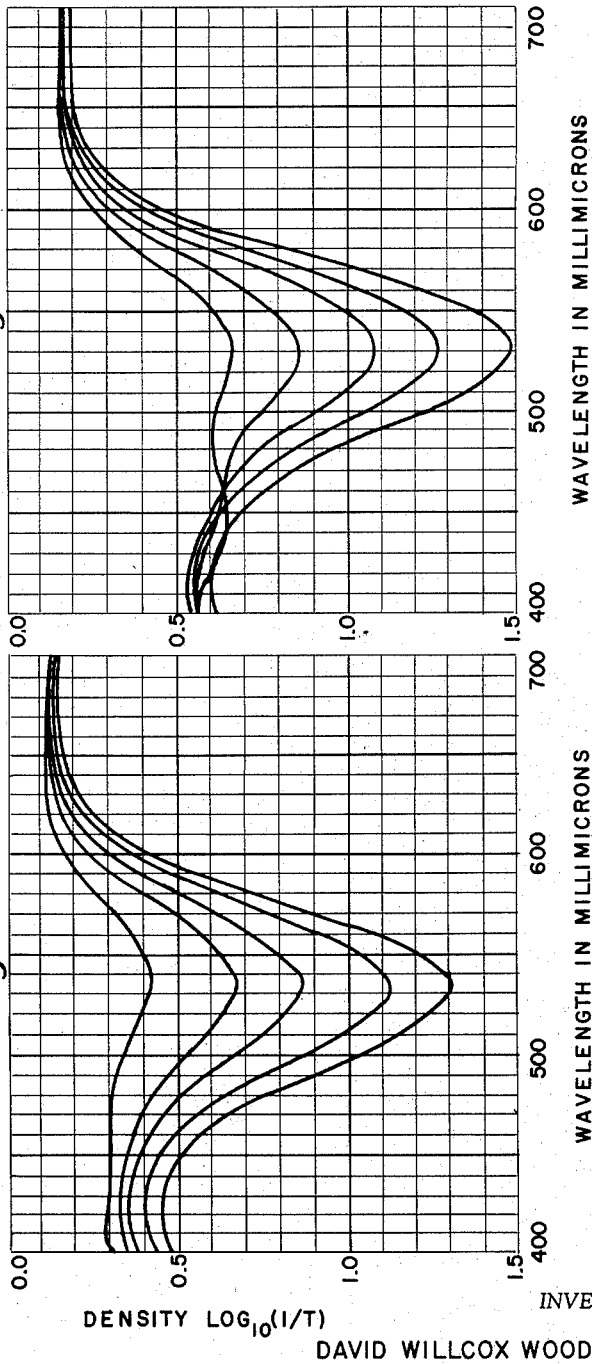

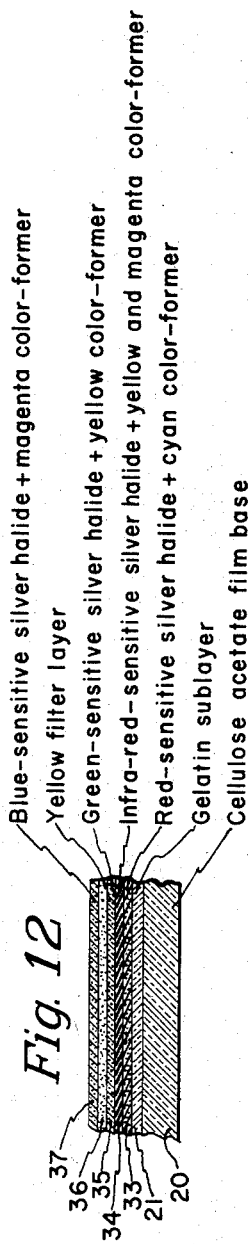
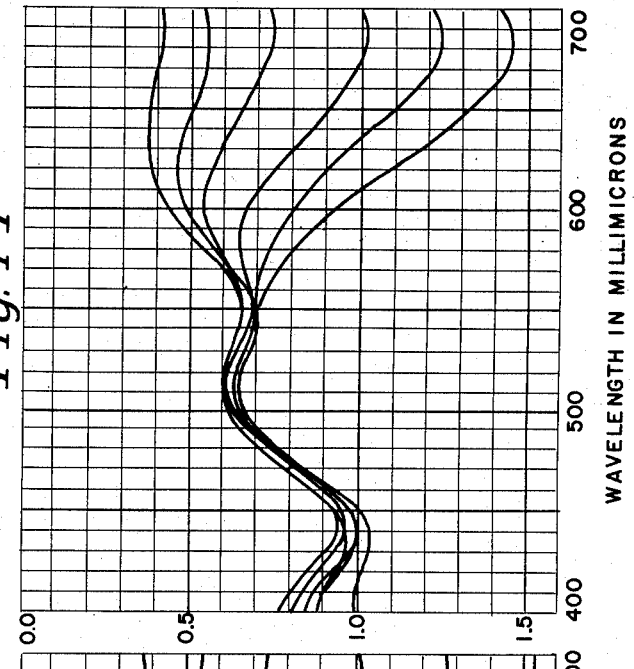
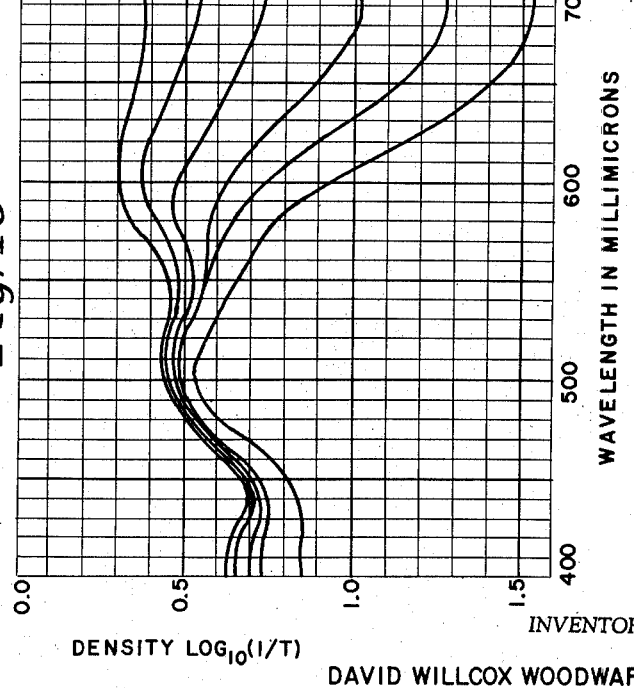

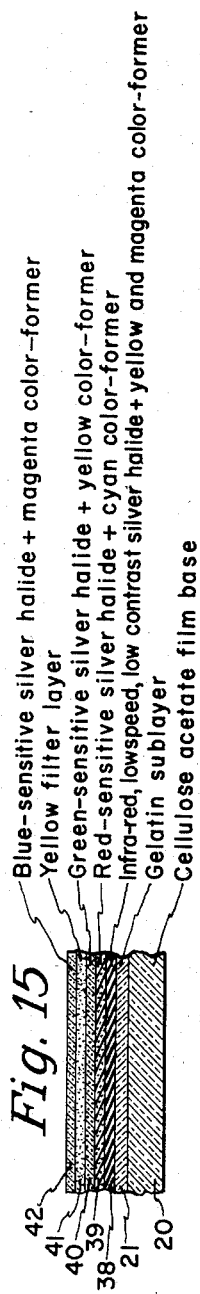
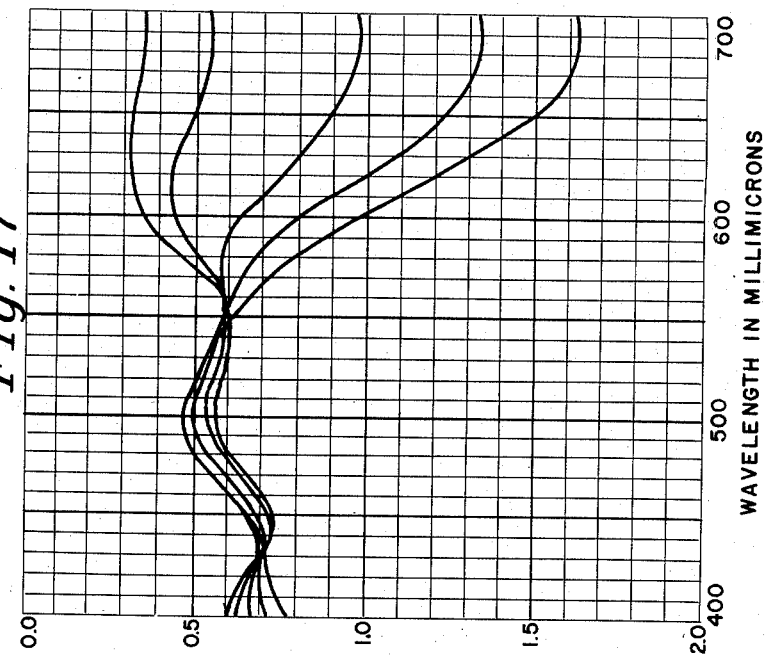
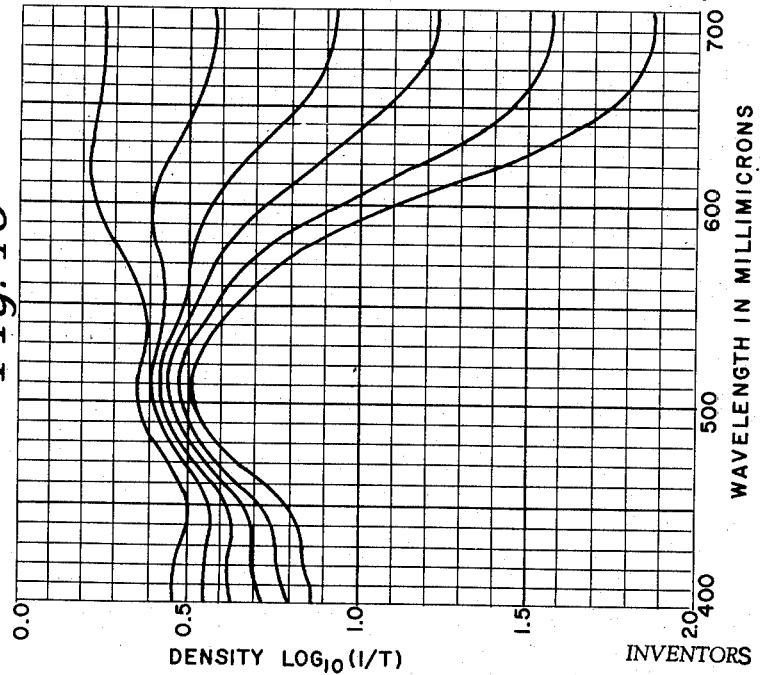

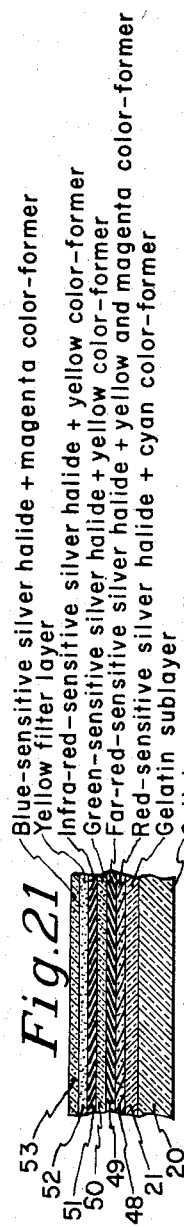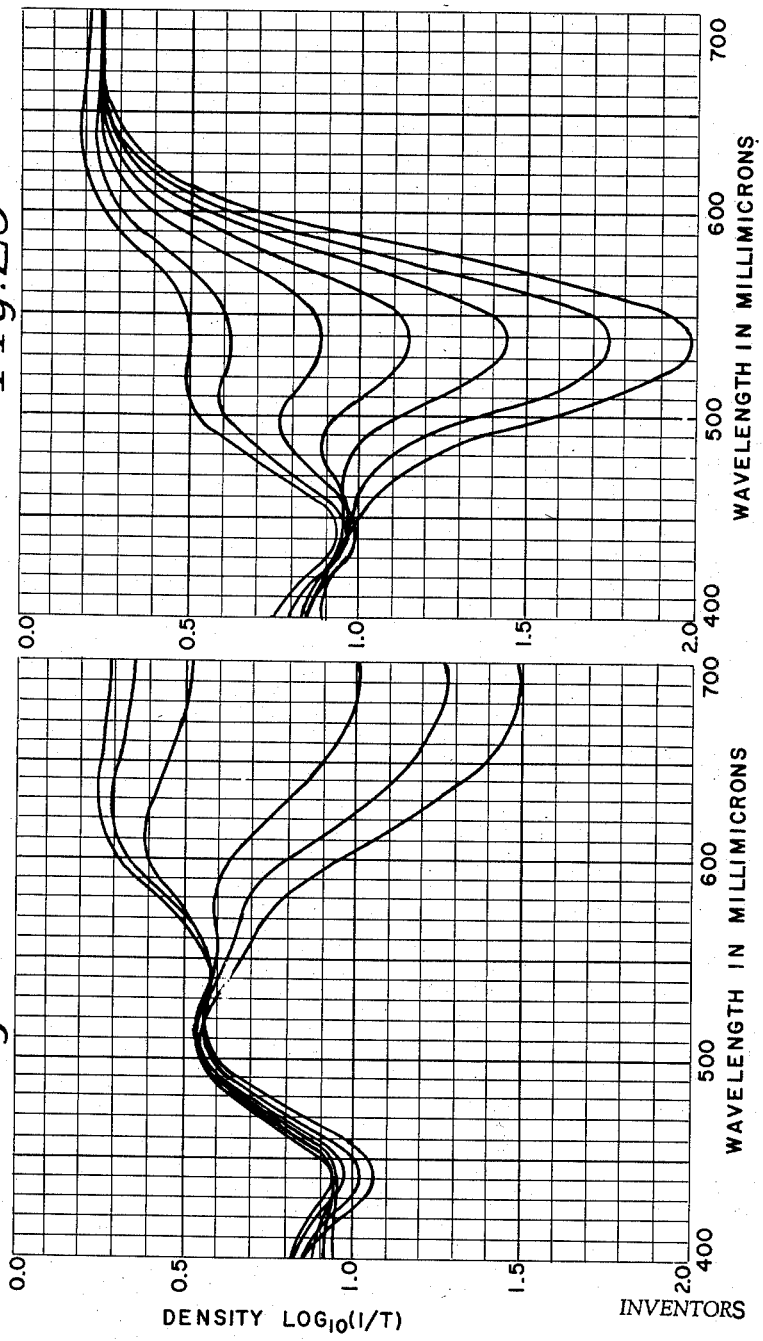

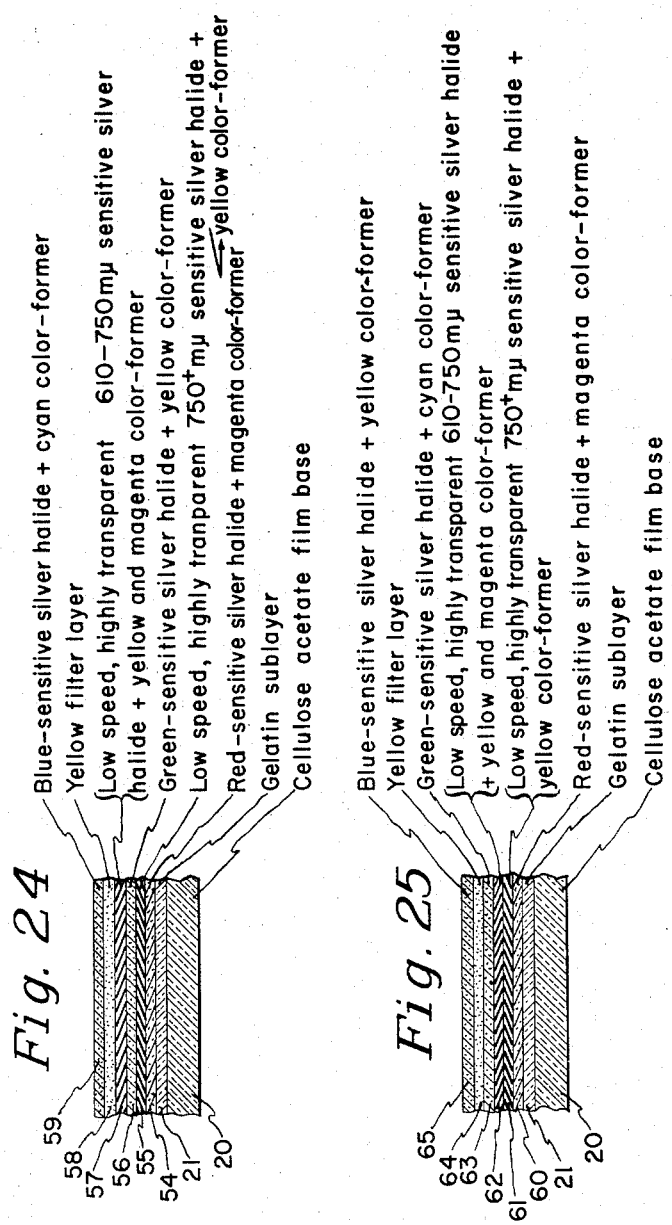

March 1, 1960 D. W. WOODWARD ET AL 2,927,019
PHOTOGRAPHIC ELEMENTS AND PROCESSES OF PHOTOGRAPHY
Filed Nov. 12, 1954 13 Sheets-Sheet 10
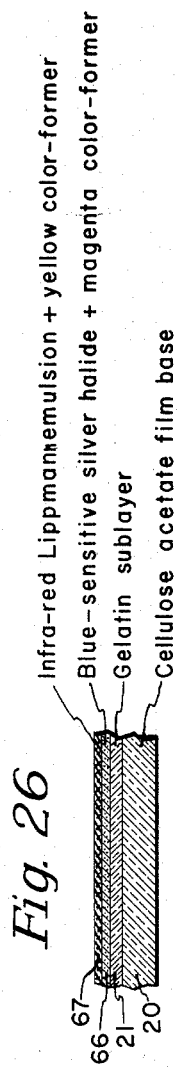
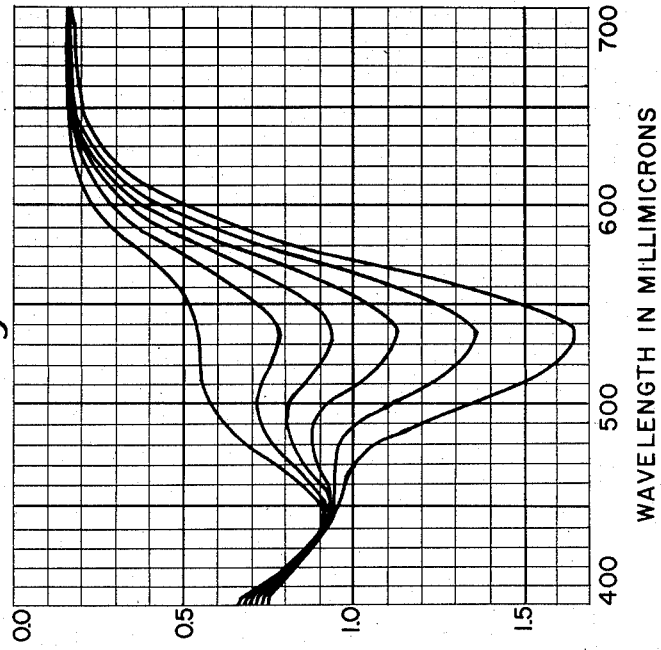
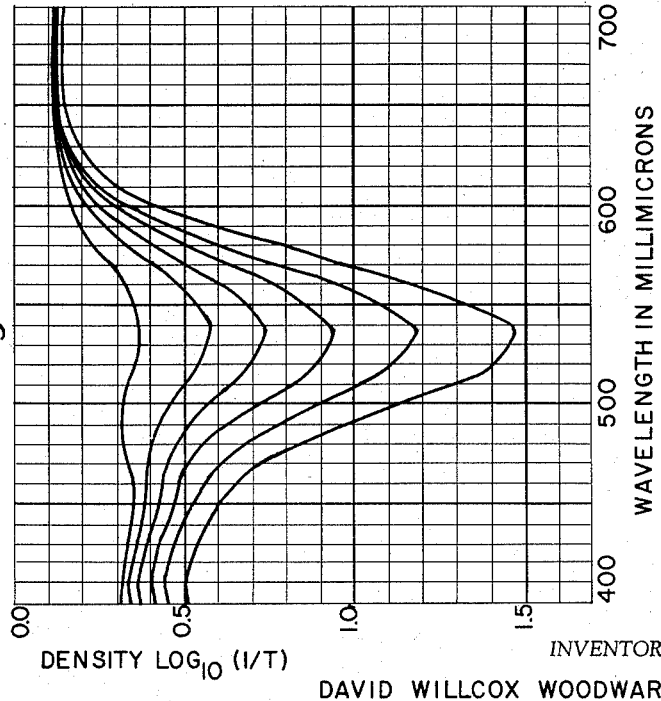
INVENTORS
DAVID WILLCOX WOODWARD
VICTOR FU HUA CHU
BY
ATTORNEY March 1, 1960    D. W. WOODWARD ET AL    2,927,019
PHOTOGRAPHIC ELEMENTS AND PROCESSES OF PHOTOGRAPHY
Filed Nov. 12, 1954     13 Sheets-Sheet 11
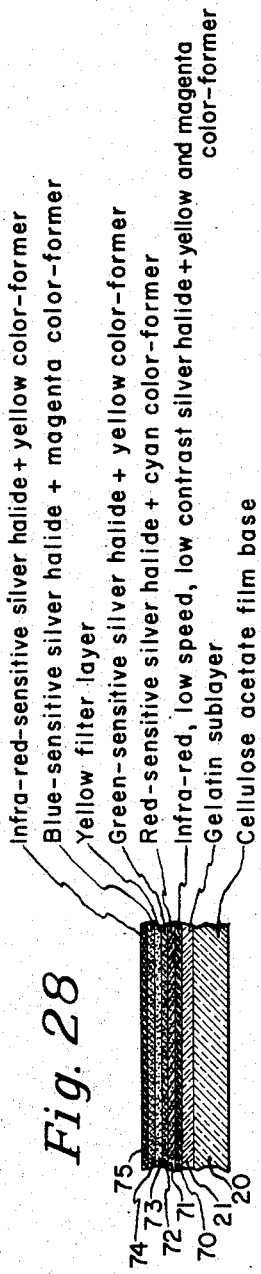
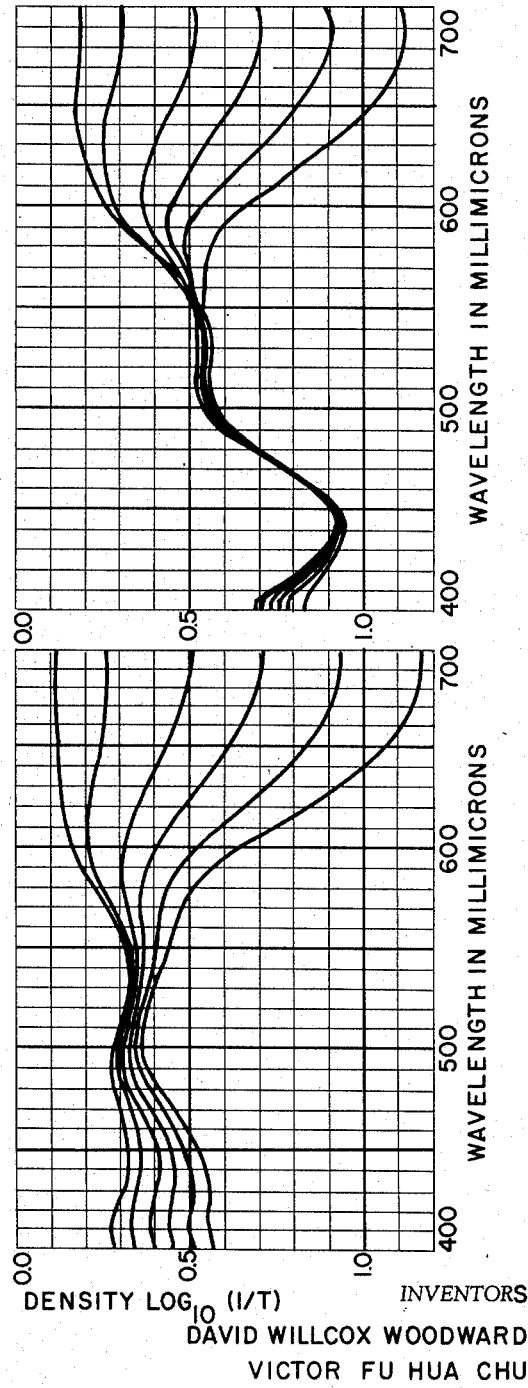
INVENTORS
DAVID WILLCOX WOODWARD
VICTOR FU HUA CHU
BY *Lynn Barrett Morris*
ATTORNEY March 1, 1960 D. W. WOODWARD ET AL 2,927,019
PHOTOGRAPHIC ELEMENTS AND PROCESSES OF PHOTOGRAPHY
Filed Nov. 12, 1954 13 Sheets-Sheet 12
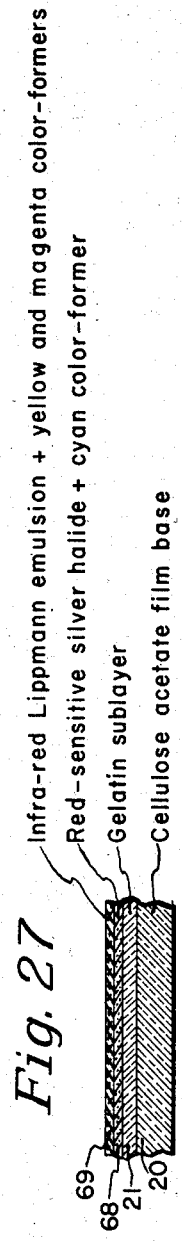
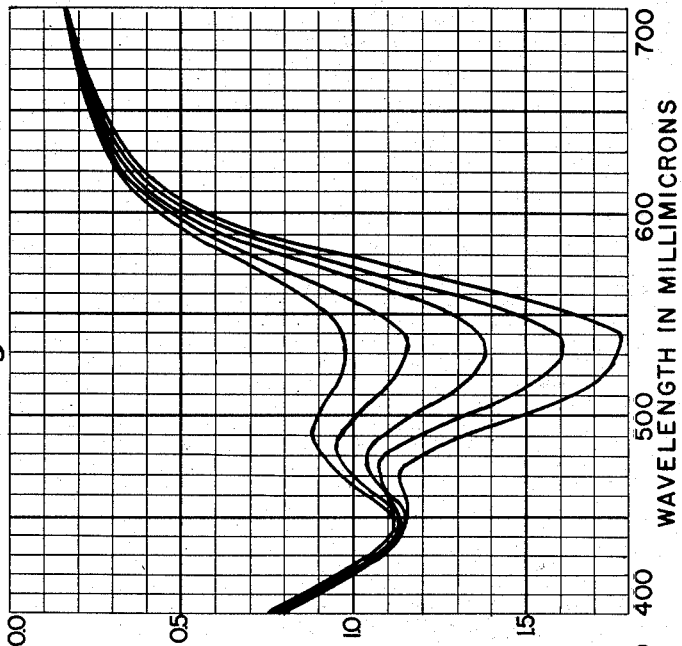
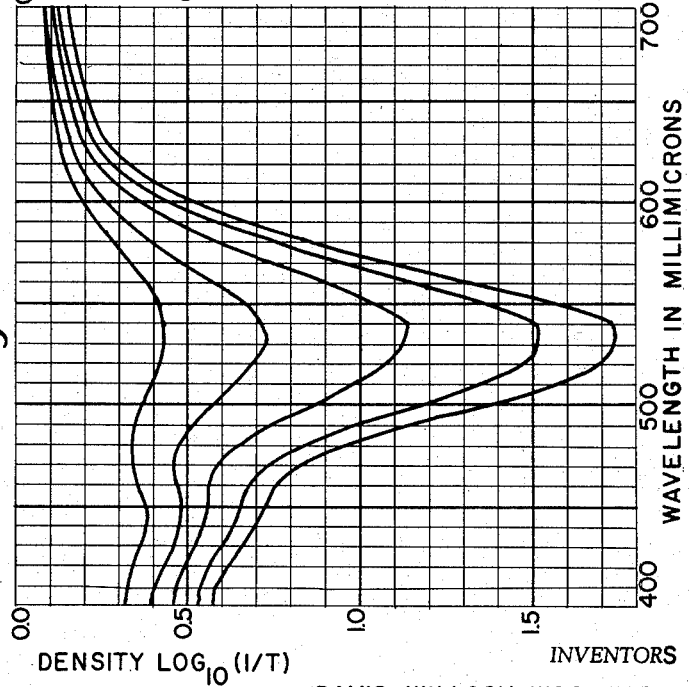
INVENTORS
DAVID WILLCOX WOODWARD
VICTOR FU HUA CHU
BY
ATTORNEY March 1, 1960 D. W. WOODWARD ET AL 2,927,019
PHOTOGRAPHIC ELEMENTS AND PROCESSES OF PHOTOGRAPHY
Filed Nov. 12, 1954 13 Sheets-Sheet 13
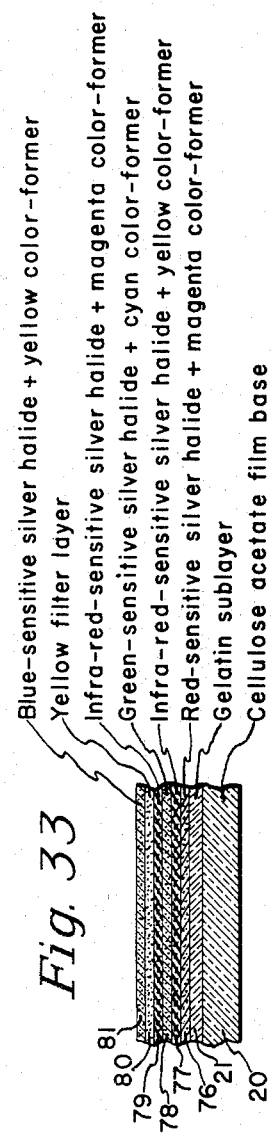
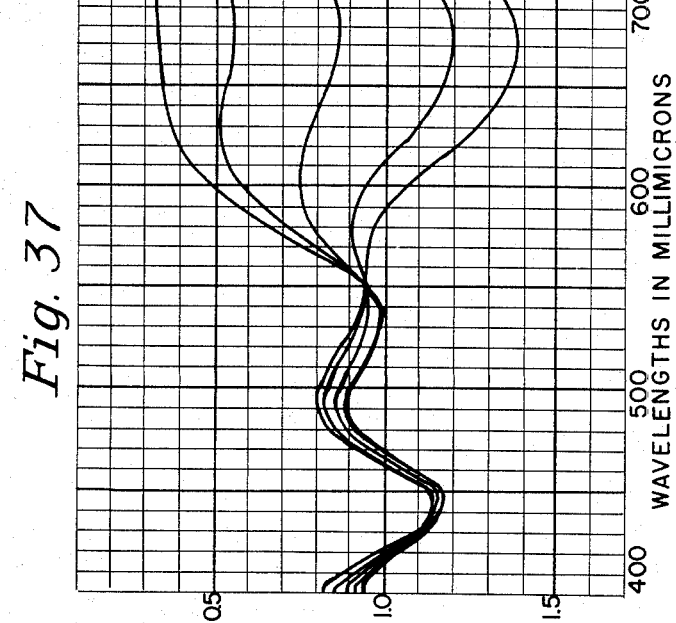
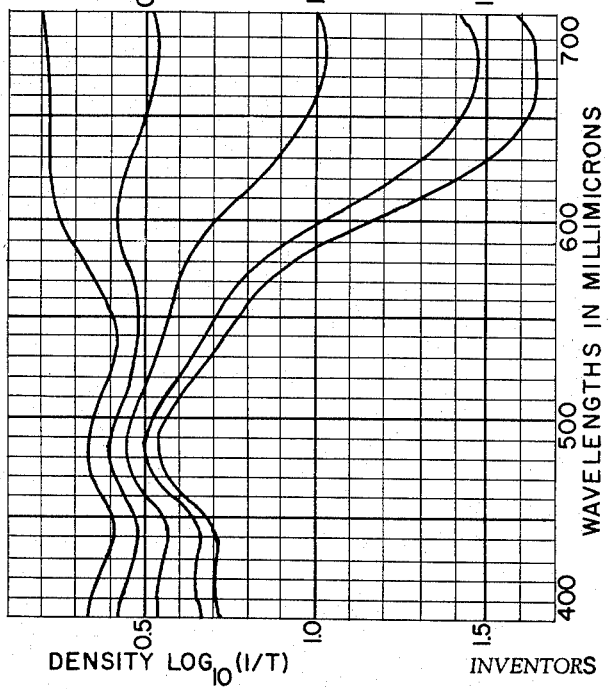
INVENTORS
DAVID WILLCOX WOODWARD
VICTOR FU HUA CHU
BY
ATTORNEY

United States Patent Office

2,927,019
Patented Mar. 1, 1960

2,927,019
PHOTOGRAPHIC ELEMENTS AND PROCESSES OF PHOTOGRAPHY

David Wilcox Woodward, Fair Haven, and Victor Fu-Hua Chu, Metuchen, N.J., assignors to E. I. du Pont de Nemours and Company, Wilmington, Del., a corporation of Delaware Application November 12, 1954, Serial No. 468,260

7 Claims. (Cl. 96—7)

This invention relates to color photography and more particularly to photographic elements and processes of forming colored images. Still more particularly, it relates to multilayer photographic films which contain light-sensitive silver halide emulsion layers of different sensitivities, each containing a non-diffusing color-former which results in a subtractive dye, and at least one light-sensitive layer containing a non-diffusing color-former which will yield a masking dye image.

Subtractive three color reproduction of the negative-positive type utilizes, in the most common form, three non-diffusing subtractive dyes. By subtractive is meant dyes which have a single absorption band in the radiation region of between about 350 millimicrons to 750 millimicrons. For positive images that are to be viewed these dyes must be complementary to the three primary colors, blue, green and red; these are yellow (minus blue), magenta (minus green) and cyan (minus red). In the case of a negative, duplicating negative or master positive, more latitude is possible since the image is to be "viewed" by another film whose sensitivity, unlike that of the eyes, can be shifted to longer or shorter wave lengths. Similarly, although a camera negative film will have peak sensitivities at about 470 m$\mu$, 560 m$\mu$ and 660 m$\mu$, the duplicating negative, master positives and release positives may have maximum sensitivities at other wave lengths corresponding to the absorption maxima of the dye images they are to be printed from. However, none of the available dyes possess ideal spectral absorption characteristics since they all absorb to some extent in regions where one or more of the other dyes also absorb light. As a result there is contamination of one dye image with another resulting in duller saturated colors. For instance, the cyan (minus red) dye image absorbs to some extent in the blue and green region and hence controls not only the red light but to a lesser extent the blue and green record. The other dyes likewise have unwanted absorption. If steps are not taken to correct these deficiencies, generally unsatisfactory and dull color reproduction results. One of the best methods for correcting the spectral characteristics of the dyes is by the use of masking images in the negative film. These masking images in general are formed in the color of the unwanted absorption of one of the subtractive dyes but are opposite in sign to the unwanted absorption, i:e:. for correcting a negative image the mask will be a positive image whose color is that of the undesirable absorption of the negative image.

Various procedures have been proposed for the formation of masking images, but they have various economic and other disadvantages, including excessive mask density, imperfect masking over the full density range, correction in only narrow spectral ranges, tedious processing and difficulty in controlling the reproducibility.

An object of this invention is to provide new multilayer photographic negative or intermediate color films which can be readily processed to multicolor images with an integral color correction masking image or images. Another object is to provide such films which can be made in a simple manner. A further object is to provide such films which can be made by the use of the standard photographic coating equipment. A still further object is to provide such films which can be processed in a relatively simple manner. Yet another object is to provide a process of producing color-corrected multicolor images utilizing such films. Still further objects will be apparent from the following description.

It has now been found that excellent integral color correction masks of the above type can readily be formed in a film for color development if, in addition to a relatively fast emulsion layer sensitive primarily to a region of the visible light and containing a non-diffusing color former of a subtractive dye, there is present adjacent thereto a relatively slower emulsion layer sensitive primarily to radiation above the visible range and containing a non-diffusing color former capable of conversion to a dye whose principal absorption is in the region of unwanted absorption of the dye formed in the relatively faster emulsion layer. With such a film a color correcting image opposite in sign to the image in the faster emulsion layer is readily formed during development of the faster layer, if the film is given an overall exposure to radiation above the visible range to which the slower emulsion is sensitive. Although some control of this supplemental exposure is required, it has been found surprisingly that in general, correction is obtained when the exposure is made from either side of a given film or conversely for a given supplemental exposure the auxiliary layer or layers may be on either side of the fast emulsion layer being color corrected. This positive mask formation occurs, it is believed, because the positive mask is formed in an unexpected manner which may be through a combination of interlayer effects and/or either absorption or reflection of infrared light by the layer being corrected. This can be seen by comparing Examples I and XI or III and XII where the same film is given a supplemental exposure from either side with comparable results. Because of this high degree of versatility, a wide range of possible structures of films of this invention are possible. As a result, a film with nearly complete color correction, good sensitometric properties and excellent sharpness can be obtained, a combination not accomplished with earlier methods. Following is a more detailed description of some of the possible film elements that form a part of this invention, as applied to a three-color subtractive process.

The novel multilayer films of this invention comprise a transparent film base which carries three light-sensitive silver halide layers and a yellow filter layer which are so disposed and sensitized that each layer is essentially sensitive to a different primary color region of the visible spectrum, and contains a non-diffusing color-former capable of yielding a subtractive dye on development in the presence of a primary amine-containing aromatic developing agent, which dye has unwanted absorption in another region of the spectrum, and at least one masking silver halide layer sensitive to light of wave lengths above about 700 m$\mu$ and relatively insensitive to light below 700 m$\mu$ preferably disposed adjacent one of said three emulsion layers, which said masking layer contains a non-diffusing color-former capable of yielding a subtractive dye of the aforesaid type having principal spectral absorption in the region of the unwanted absorption of one of the said subtractive dyes.

A multilayer film element, as described above, is exposed to a multicolor scene, to a multicolor image of such a scene, or to three color separation records of such a scene. The film is then developed in a solution containing a primary amine-containing aromatic color-developing agent to form a silver image and a subtractive dye image simultaneously and in situ therewith and during such development the masking silver halide emulsion layer, or layers, are given a supplemental exposure from either or both sides of the element to light of wave lengths greater than 700 m$\mu$ and for such a period that there occurs no significant exposure of the other emulsion layers, and continuing the development whereby a masking image is formed which corrects the unwanted partial image of the record image or images adjacent to or through which the supplemental exposure was made.

The multilayer film elements of the invention, of course, will vary somewhat in structure because the various record image layers can be disposed in a number of different arrangements. For the sake of simplicity and clarity in explaining the invention, reference will be made to films having light-sensitive silver halide emulsion layer arrangements, from the normal exposure surface to the film support, as follows: (1) blue, green and red sensitive and (2) blue, red and green sensitive, it being understood that a yellow filter layer or stratum is disposed in front of the green and red layers to prevent their exposure by blue light.

Although with three subtractive color-formers in the layers and the two layer arrangements just recited, there are twelve arrangements possible, four arrangements having the yellow color-former in either the middle or top layer and the sensitivity arrangement (1) above will be described, in exemplification of the invention. The four arrangements are:

(A) 1-magenta   2-yellow    3-cyan and film base
(B) 1-cyan      2-yellow    3-magenta and film base
(C) 1-yellow    2-magenta   3-cyan and film base
(D) 1-yellow    2-cyan      3-magenta and film base In film A the unwanted blue light absorption of the magenta dye can be corrected by coating adjacent to layer 1 a relatively slower emulsion sensitive to radiation of wave lengths between 750 and 800 m$\mu$ containing a yellow color-former. The film is exposed to a scene, color developed and, during development, given an overall exposure through the top layer to infrared radiations of wave lengths greater than 750 millimicrons. Development is completed and the silver and silver salts removed to yield a film containing, in addition to the normal three negative dye images, a yellow positive image corresponding to the magenta negative image. When the contrast of this positive yellow image has been made equal but opposite in sign to that of the blue density component of the negative magenta image, the magenta dye image no longer will modulate blue light and hence is corrected for its unwanted blue light absorption. The contrast of the yellow positive image is determined by (a) the gamma of the negative image to the supplementary exposing light at the time of exposure, (b) the inherent contrast of the auxiliary layer and (c) the development conditions subsequent to supplemental exposure. The desired contrast of the yellow positive image is, of course, low since the unwanted blue absorption of the magenta negative image usually is only about 10 to 30% as great as its absorption of green light.

In film A the unwanted absorption of the cyan image may be corrected at the same time, by introduction of an orange color-forming layer having maximum dye conferred sensitivity at about 720 m$\mu$ adjacent to layer 3. Although two unwanted absorptions, blue and green, are involved and two masks would be required for theoretical corrections, for practical purposes a single mask combining both corrections is sufficient and the description will be limited to such a mask. During the developing step, the film is given an overall exposure through the back to radiation having maximum energy at about 720 m$\mu$. After completing development the film contains an orange positive image corresponding to the cyan negative image. Color correction of the cyan image has been achieved when the gamma of this mask image is equal but opposite in sign to that of the unwanted blue and green components. These are usually about equal when measured at about 420 m$\mu$ and 550 m$\mu$. Since unwanted blue and green densities of the cyan dye are only about 10 to 30% as great as the density to red light, the contrast of the positive mask image should be only about 10 to 30% that of the negative image. In this case the exposure is made in the presence of a silver and cyan image at 720 millimicrons, where the density of the cyan dye plus silver is about the same as the dye alone at 680 millimicrons. Hence, to obtain a mask gamma equivalent to the blue and green density of the cyan image, it is necessary to use an auxiliary layer having an inherent contrast about 10 to 30% that of the cyan dye image.

The same film (A) can be prepared with the high contrast magenta mask, as before, adjacent to layer 1 and the low contrast cyan mask under layer 3. When the film is given a supplementary overall exposure from the front during development to light of wave lengths greater than 700 millimicrons, the same masks are formed as in the above case. The low contrast silver image of the top emulsion forms a mask image, as before, in the high contrast auxiliary layer sensitive to radiation above 750 millimicrons. This corrects the blue density of the magneta image. The exposure in the bottom low inherent contrast auxiliary layer having maximum sensitivity at 720 millimicrons is controlled primarily by the high gamma cyan dye and silver image to form an orange mask correcting for the unwanted blue and green densities of the cyan dye. Because this bottom auxiliary layer is of such low inherent contrast its exposure is controlled almost entirely by the cyan dye plus silver image. The yellow and magenta dyes are transparent at the wave lengths used for exposure and masks formed from the silver images of these layers amount to less than 25% of their dye density. The resulting small decrease in contrast of the yellow and magenta dye images can readily be compensated by increasing slightly the inherent contrasts of these emulsions or by increasing the development time or temperature. This film structure, particularly with the magneta mask on top of the film, is desirable because the distance between the record emulsions is kept to a minimum and, if the top masking emulsion is relatively transparent, little or no effect on sharpness will be noted.

A film of the same sensitivity color-former arrangement may also be corrected by using auxiliary emulsions of gamma about 1.0 between layers 1 and 2 and layers 2 and 3. The first of these will contain a color-former whose color developed dye (yellow) corresponds to the unwanted absorption of the magenta dye and which has maximum sensitivity to radiation of wave lengths 710 to 750 m$\mu$. The second auxiliary layer contains a color-former whose color developed dye (orange) corresponds to the unwanted absorption of the cyan dye and which is sensitive to radiation of wave length greater than 750 m$\mu$. After normal exposure and during development, the film is given a second exposure from the front to radiation of between 710 and 730 m$\mu$ and from the rear to radiation of greater than 750 m$\mu$ of such duration as to form positive latent images in the masking emulsions. Development is continued to give mask images equal in gamma but opposite in sign to the unwanted partial images in the magenta and cyan layers respectively.

A similar masking procedure can be applied to film B above by reversing the position of the auxiliary layers and placing a low contrast orange color-former-containing emulsion having maximum sensitivity at 720 m$\mu$ next to layer 1 and higher contrast yellow color-former-containing emulsion sensitive above 750 m$\mu$ adjacent to layer 3. The film is exposed, color developed, and during development exposed from the front to radiation of 710 to 740 m$\mu$ wave length and from the rear to longer wave length radiation. On completion of processing, a film corrected as above is obtained.

Film C may be effectively corrected for the unwanted blue absorption of both the cyan and magenta dyes by incorporating adjacent to layer 2 a yellow color-former-containing emulsion sensitive above 750 m$\mu$ and having an inherent gamma of about 1.0. The green absorption of the cyan may be corrected by coating adjacent to layer 3 a magenta (minus green) color-former-containing emulsion sensitive at about 720 m$\mu$ and having an inherent gamma of about 0.2. Such a film is exposed normally and color developed. During color development, it is given a uniform exposure through the base to radiation of wave length greater than 700 m$\mu$ and development and processing completed. The masking image recorded in the top auxiliary high contrast emulsion layer by the longer wave length light, which is modulated by the low contrast silver images of the magenta and cyan layers, will be a low contrast (gamma about 0.2) positive yellow image which will correct for the unwanted blue absorption of the cyan and magenta images. Simultaneously, a magenta mask will have been formed in the lower auxiliary layer. This, having been recorded in the lower contrast masking emulsion by the shorter wave length infra-red radiation controlled by the high contrast cyan image, will be a low contrast (gamma about 0.2) magenta image which will correct for the unwanted green absorption of the cyan image.

As an alternative a single orange color-former containing auxiliary emulsion having a low contrast and being sensitive above 750 m$\mu$ may be coated between layers 2 and 3 of film C. By proper balance of the inherent gammas of the three record emulsions, this film C may be corrected for the three major color deficiencies by a single exposure with radiation of wave length above 750 m$\mu$ during the color development. The resulting film will contain correcting images for the blue absorption of the magenta and cyan and the green absorption of the cyan image. In addition there will be a low contrast positive green record of the magenta, but this will have been compensated for by selecting a higher gamma magenta record emulsion so that after masking a neutral gray scale over the full density range will be obtained.

For film D the method of the preceding paragraph using a single mask may also be used. However, better correction is obtained by using two auxiliary emulsions as with films A and B above. One of these will be coated adjacent to the cyan emulsion and will be an orange color-forming low contrast emulsion having maximum sensitivity at about 730 m$\mu$. The other will be coated adjacent to the magenta emulsion and will contain a yellow color-former, be higher in contrast and sensitive at about 750 m$\mu$. During color development the appropriate supplemental exposure, depending on the position of the masking layers, is given. The resulting film will again be corrected for the three major deficiencies of the subtractive dyes.

Although the color-former used in the mask for correcting the cyan image is referred to as orange in the preceding paragraphs, the ideal orange dye image would absorb more strongly in the region of 400 to 450 m$\mu$ and 500 to 550 m$\mu$ than between 450 and 500 m$\mu$. A mixture of a yellow color-former yielding a dye having an absorption maximum near 445 m$\mu$ and a magenta color-former having an absorption maximum near 533 m$\mu$ is preferred to an orange color-former yielding a dye having a single absorption maximum near 475 m$\mu$.

In preparing these films described above, the contrasts of the various color component dye images of the unmasked film are determined. Thus, the gamma is measured at, for instance, 420, 550 and 690 m$\mu$ for the dye image formed in each layer of the film. The principal undesired values, that of the magenta at 420 and cyan at 420 and 550 are the values to be corrected. Next the gammas of the magenta and cyan layers to the light to be used for supplemental exposure are determined as they would be during development, i.e., dye plus silver. With these values it is a simple matter to calculate what the inherent gamma of the masking emulsion must be to yield a mask which matches the undesired gammas of the cyan and magenta images.

When a suitable film containing the auxiliary masking emulsions has been prepared, the simplest method for determining the proper supplemental exposure is to develop a series of sensitometric exposures made through appropriate filters. During development, the films are given exposures at different times to different intensities of radiation above 700 m$\mu$. After processing, the results are analyzed by known methods to determine which exposure and processing gives the best color correction.

The silver halide emulsions used in the auxiliary layers should be of the finest grain and a preferred type is the transparent, extremely fine grain emulsion known as the Lippmann emulsion. Although such emulsions are normally very slow to visible light, adequate speeds to infra-red light are readily obtained by dye sensitization. Suitable sensitizing dyes include 2,2'-diethyl thiatricarbocyanine p-toluene sulfonate, 2,1'-diethyl-3,4, benzothia - 4' - carbocyanine iodide, 3,3'-diethyl-5,5'-dimethyl thiatricarbocyanine iodide, 2-ethyl-3,4-benzothia-2'-benzyl-6'-methyl-carbocyanine bromide and and 2,1'-diethyl-6'-bromo-3,4-benzothia-4'-carbocyanine ethosulfate.

Advantages in using such emulsions are that being transparent, they do not scatter light and so do not adversely affect the resolution or sharpness of the film.

In the accompanying drawings which form part of this specification:

Figure 1 is a schematic sectional view of the film element of Example I;

Figure 2 is a graph containing spectrophotometric curves of the magenta dye image of different densities before color correction of the film element of Figure 1;

Figure 3 is a graph containing spectrophotometric curves of the magenta dye image of different densities after color correction of the film element of Figure 1;

Figure 4 is a schematic sectional view of the film element of Example II;

Figure 5 is a graph containing spectrophotometric curves of the cyan dye image of different densities after color correction of the film element of Figure 4;

Figure 6 is a schematic sectional view of the film element of Example III;

Figure 7 is a graph containing spectrophotometric curves of the cyan dye image of different densities before color correction of the film element of Figure 6;

Figure 8 is a graph containing spectrophotometric curves of the cyan dye image of different densities after color correction of the film element of Figure 6;

Figure 9 is a schematic sectional view of the film element of Example IV;

Figure 10 is a graph containing spectrophotometric curves of the magenta dye image of different densities before color correction of the film element of Figure 9;

Figure 11 is a graph containing spectrophotometric curves of the magenta dye image of different densities after color correction of the film element of Figure 9;

Figure 12 is a schematic sectional view of the film element of Example V;

Figure 13 is a graph containing spectrophotometric curves of the cyan dye image of different densities before color correction of the film element of Figure 12;

Figure 14 is a graph containing spectrophotometric curves of the cyan dye image of different densities after color correction of the film element of Figure 12;

Figure 15 is a schematic sectional view of the film element of Example VI;

Figure 16 is a graph containing spectrophotometric curves of the cyan dye image of different densities before color correction of the film element of Figure 15;

Figure 17 is a graph containing spectrophotometric curves of the cyan dye image of different densities after color correction of the film element of Figure 15;

Figure 18 is a schematic sectional view of the film element of Example VII;

Figure 19 is a graph containing spectrophotometric curves of the cyan dye image of different densities before color correction of the film element of Figure 18;

Figure 20 is a graph containing spectrophotometric curves of the cyan dye image of different densities after color correction of the film element of Figure 18;

Figure 21 is a schematic sectional view of the film element of Example VIII;

Figure 22 is a graph of the spectrophotometric curves of the cyan dye image of different densities after color correction of the film element of Figure 21;

Figure 23 is a graph of the spectrophotometric curves of the magenta dye image of different densities after color correction of the film element of Figure 21;

Figure 24 is a schematic sectional view of the film element of Example IX;

Figure 25 is a schematic sectional view of the film element of Example X;

Figure 26 is a schematic sectional view of the film element of Example XI;

Figure 27 is a schematic sectional view of the film element of Example XII;

Figure 28 is a schematic sectional view of the film element of Example XIII;

Figure 29 is a graph containing spectrophotometric curves of the magenta dye image of different densities before color correction of the film element of Figure 28;

Figure 30 is a graph containing spectrophotometric curves of the magenta dye image of different densities after color correction of the film element of Figure 28;

Figure 31 is a graph containing spectrophotometric curves of the cyan dye image of different densities before color correction of the film element of Figure 28;

Figure 32 is a graph containing spectrophotometric curves of the cyan dye image of different densities after color correction of the film element of Figure 28;

Figure 33 is a schematic sectional view of the film element of Example XIV;

Figure 34 is a graph containing spectrophotometric curves of the magenta dye image of different densities before color correction of the film element of Figure 33;

Figure 35 is a graph containing spectrophotometric curves of the magenta dye image of different densities after color correction of the film element of Figure 33;

Figure 36 is a graph containing spectrophotometric curves of the cyan dye image of different densities before color correction of the film element of Figure 33; and Figure 37 is a graph containing spectrophotometric curves of the cyan dye image of different densities after color correction of the film element of Figure 33.

The invention will be further illustrated but is not intended to be limited by the following examples:

*Example I*

A film element as shown in Figure 1 of the drawing comprises a transparent cellulose acetate film base 20 bearing in order on one surface a thin gelatin sublayer 21, an infra-red sensitive Lippmann-type gelatino-silver bromide emulsion layer 22 having a developable gamma of approximately unity containing the yellow color-former, m-benzoylacetamidobenzaldehyde polyvinyl acetal (U.S. Patent 2,464,597) and a green-sensitive gelatino-silver halide emulsion layer 23 containing the magenta color-former, 2-cyanoacetyl-3-phenyl-5-benzofuraldehyde polyvinyl acetal (U.S. Patent 2,680,732), is given an exposure of low intensity which exposes layer 23 and after being developed for 6 minutes at 70° F. in a solution made by admixing the following components:

| | Grams |
|---|---|
| p-Aminodiethylaniline monohydrochloride | 2.5 |
| Sodium sulfite (anhydrous) | 10.0 |
| Sodium carbonate monohydrate | 47.0 |
| Potassium bromide | 2.0 |
| Water to make 1.0 liter. | |
| Adjust pH to 10.5. | | is given a second overall exposure through a "Wratten" No. 87 filter from either the emulsion or base side by means of a 110 volt, 150 watt tungsten filament incandescent lamp maintained at a distance of 30 inches from the film. The development is continued for a total of 9 minutes whereby a positive yellow image is formed in layer 22 which has an opposite gradation in density with respect to the developed silver image in layer 23 and thereby corrects for the unwanted blue absorption of the magenta negative image. After development and following a short rinse, the film is treated successively in the first fixer, bleach and second fixer with a water rinse interspersed. These processing solutions have the following compositions:

First fixer:
| | | |
|---|---|---|
| Water (125° F.) | ml | 300.0 |
| Hypo | g | 80.0 |
| Sodium sulfite (anhydrous) | g | 5.0 |
| Borax | g | 6.0 |
| Acetic acid, glacial | g | 3.0 |
| Potassium alum | g | 6.7 |
| Water to make 1.0 liter. | | |

Bleach:
| | | |
|---|---|---|
| Potassium ferricyanide | g | 100.0 |
| Potassium bromide | g | 15.0 |
| Water to make 1.0 liter. | | |
| Adjust pH to 7.0–8.0. | | |

Second fixer:
| | | |
|---|---|---|
| Hypo | g | 200.0 |
| Water to make 1.0 liter. | | |
| Adjust pH to 8.0. | | |

The film is finally washed and dried. In Figures 2 and 3 are given spectrophotometric curves of the magneta dye image of different densities respectively before and after color correction by the above-described method. It is clearly shown that the unwanted blue absorption of the magenta dye is completely corrected.

Similar results are obtained by substituting for the magenta color-former an equivalent amount of a m-[p-(5 - ethylcarbonato - 3 - methyl - 1 - pyrazolyl)benzamido]benzaldehyde polyvinyl acetal (Martin U.S. Patent 2,476,988).

*Example II*

A photographic film, as shown in Figure 4 of the drawing, comprises a cellulose acetate film 20 bearing in order on one surface a gelatin sublayer 21, a low speed infra-red sensitive silver halide emulsion layer 24 containing the yellow color-former of Example I and a red-sensitive silver halide emulsion layer 25 containing as a cyan color-former, m-(3-methyl salicylamido)benzaldehyde polyvinyl acetal (Martin U.S. Patent 2,489,655). The film is first given an exposure of low intensity to light from the emulsion side (which exposes the outer layer) and after being developed for 6 minutes at 70° F. in the color developer described in Example I is given an overall exposure through a "Wratten" No. 87 filter from either the emulsion or base side, and development is continued for a period of 9 minutes and then the film is washed, fixed, bleached, fixed, washed and dried as described in Example I. The spectrophotometric curves of the cyan dye image of different densities of the film are shown in Figure 7 before correction and in Figure 5 after color correction. The unwanted blue absorption of the cyan dye is corrected completely. Similar results are obtained by substituting for the cyan color-former m-(1-acetoxy-2-naphthalene sulfamido)benzaldehyde polyvinyl acetal (Woodward U.S. Patent 2,423,572).

*Example III*

A photographic film, as shown in Figure 6 of the drawing, comprises a cellulose acetate film 20 bearing in order on one surface a gelatin sublayer 21, a low speed infrared sensitive silver halide emulsion layer 26 having a developable gamma of about 0.3 containing an equi-molar mixture of the yellow and the second magenta color-former described in Example I and a red-sensitive silver halide emulsion layer 27 containing a cyan color-former, as described in Example II. The film is first given an exposure of low intensity from the emulsion side (this exposes only the outer layer) and after being developed in a color developer, as described in Example I, for 6 minutes at 70° F., is given an overall exposure through a "Wratten" No. 88A filter, from either side. Development is continued for 9 minutes and the film is washed, fixed, bleached, fixed, washed and dried as set forth in Example I. In Figures 7 and 8 of the drawing, there are shown spectrophotometric curves of the cyan dye images of different densities of the film before and after color correction. The unwanted blue and green absorptions of the composite cyan dye image is corrected completely.

*Example IV*

A photographic film, as shown in Figure 9 of the drawing, comprises a cellulose acetate film 20 bearing in order on one surface a gelatin sublayer 21, a red-sensitive silver halide emulsion layer 28 containing a cyan color-former as described in Example II, green-sensitive silver halide emulsion layer 29 containing a yellow color-former as described in Example II, an infra-red sensitive Lippmann type silver bromide emulsion layer 30 also containing the same yellow color-former, a yellow filter layer 31 composed of yellow colloidal silver dispersed in gelatin as described in Weaver U.S. application Ser. No. 366,877, filed July 8, 1953 (U.S. Patent 2,806,798, September 17, 1957), and a blue-sensitive silver halide emulsion layer 32 containing a magenta color-former as described in Example I. The film is given an exposure of low intensity from the emulsion side, which exposes all layers except the Lippmann emulsion. After being developed for 7 minutes at 70° F. in a color developer as described in Example I, the film is given a second overall exposure through a "Wratten" No. 87 filter from the emulsion side, development is continued for a total of 9 minutes and the film is washed, fixed, bleached, fixed, washed and dried as set forth in Example I. The spectrophotometric curves of the magenta dye image of different densities, before and after color correction, are shown in Figures 10 and 11 respectively. As clearly indicated, the unwanted blue absorption of the magenta dye is well corrected.

*Example V*

A photographic film, as shown in Figure 12 of the drawing, comprises a cellulose acetate film 20 bearing in order on one surface a gelatin sublayer 21, a red-sensitive silver halide emulsion layer 33 containing a cyan color-former as described in Example II, an infra-red sensitive Lippmann type silver bromide emulsion layer 34 containing the yellow and magenta color-formers described in Example III, a green-sensitive silver halide emulsion layer 35 containing a yellow color-former as described in Example I, a yellow filter layer 36 similar to that described in Example IV, and a blue-sensitive emulsion layer 37 containing a magenta color-former as described in Example I. The film is given an exposure of low intensity from the emulsion side, which exposes all layers except the Lippmann emulsion. After being developed for 6 minutes at 70° F. in a color developer as described in Example I, the film is given a second overall exposure through a "Wratten" No. 87 filter from the base side, development is continued for a total of 9 minutes and film is washed, fixed, bleached, fixed, washed and dried as set forth in Example I. The spectrophotometric curves of the cyan dye image of different densities, before and after color correction, are shown in Figures 13 and 14 respectively. As clearly indicated, the unwanted blue and green absorption of the cyan dye is well corrected.

*Example VI*

A photographic film, as shown in Figure 15 of the drawing, comprises a cellulose acetate film 20 bearing in order on one surface a gelatin sublayer 21, an infra-red sensitive low speed and low contrast silver halide emulsion layer 38 containing a yellow and a magenta color-former, as described in Example III, a red-sensitive silver halide emulsion layer 39 containing a cyan color-former as described in Example II, a green-sensitive silver halide emulsion layer 40 containing a yellow color-former as described in Example I, a yellow filter layer 41 as described in Example IV, and a blue-sensitive silver halide emulsion layer 42 containing a magenta color-former as described in Example I. After being developed for 4 to 5 minutes at 70° F. in a color developer as described in Example I, the film is given a second overall exposure through a "Wratten" No. 87 filter from either the emulsion or base side, development is continued for a total of 9 minutes and the film is washed, fixed, bleached, fixed, washed and dried as set forth in Example I. The spectrophotometric curves of the cyan dye image of different densities, before and after color correction, are shown in Figures 16 and 17 respectively. As clearly indicated, the unwanted blue absorption of the cyan dye is well corrected.

*Example VII*

A photographic film, as shown in Figure 18 of the drawing, comprises a cellulose acetate film 20 bearing in order on one surface a gelatin sublayer 21, an infra-red sensitive low speed and low contrast silver halide emulsion layer 43 containing a yellow color-former, as described in Example I, a red-sensitive silver halide emulsion layer 44 containing a magenta color-former as described in Example I, a green-sensitive silver halide emulsion layer 45 containing a yellow color-former, as described in Example I, a yellow filter layer 46, as described in Example V, and a blue-sensitive silver halide emulsion layer 47 containing a cyan color-former, as described in Example II. The film is given an exposure of low intensity to a multicolor object field from the emulsion side which exposes all layers except the inner infra-red sensitive layer. The exposed film, after being developed in the color developer of Example I until a silver image is formed in the three outer emulsion layers, is given an overall exposure through a "Wratten" No. 88A filter from either the emulsion or base side. Development is continued for a total of 9 minutes and the developed film is washed, fixed, bleached, fixed, washed and dried as set forth in Example I. The spectrophotometric curves of the cyan dye of different densities, before and after correction, are shown in Figures 19 and 20, respectively.

*Example VIII*

A photographic film, as shown in Figure 21 of the drawing, comprises a cellulose acetate film 20 bearing in order on one surface a gelatin sublayer 21, a red-sensitive silver halide emulsion layer 48 containing a cyan color-former as described in Example II, a low speed silver halide emulsion layer 49 having maximum sensitivity at about 720 m$\mu$ containing both a yellow and a magenta color-former as described in Example III, a green-sensitive silver halide emulsion layer 50 containing a yellow color-former as described in Example I, an infra-red sensitive Lippmann type silver bromide emulsion layer 51 sensitive to light above 750 m$\mu$ containing a yellow color-former as in layer 50, a yellow filter layer of the type described in Example IV, and a blue-sensitive silver halide emulsion layer 53 containing a magenta color-former as described in Example I. The film is first given an exposure of low intensity to a multicolor object field which exposes all emulsion layers except layers 49 and 51, since they are slow in speed and not very sensitive to light. The film is color developed in a developer of the type set forth in Example I and prior to the completion of development the film is given an overall exposure through a "Wratten" No. 87 filter from the emulsion side and through a filter pack comprising "Corning" Nos. 5130 and 9830 and "Wratten" Nos. 89 and 89A, which transmits light mainly in the region between 690 m$\mu$ and 730 m$\mu$, from the support side prior to completion of color development. Development is continued for a total of 9 minutes and the film is washed, fixed, bleached, fixed, washed and dried after the manner set forth in Example I. In Figures 22 and 23, there are shown spectrophotometric curves of cyan and magenta dye images of different densities after correcting by the above-described method. Comparing these curves with those of Figures 2 and 7, it becomes evident that the unwanted blue absorption of the magenta dye and the unwanted blue and green absorptions of the cyan dye are well corrected.

*Example IX*

A photographic film, as shown in Figure 24 of the drawing, comprises a cellulose acetate film 20 bearing in order on one surface a gelatin sublayer 21, a red-sensitive silver halide emulsion layer 54 containing a magenta color-former, as described in Example I, a low speed and highly transparent silver halide emulsion layer 55 sensitive to radiation above 756 m$\mu$ containing the yellow color-former of Example I, a green-sensitive silver halide emulsion layer 56 containing a yellow color-former as in layer 55, a low speed and highly transparent silver halide emulsion layer 57 having its maximum sensitivity approximately at 720 m$\mu$ containing a mixture of a yellow and a magenta color-former as in layers 54 and 55, a yellow filter layer 58 of the type described in Example V and a blue-sensitive silver halide emulsion layer 59 containing a cyan color-former as described in Example II. The film is first given an exposure of low intensity to a multicolor object field which exposes all layers except layers 55 and 57, since they are slow in speed and not very sensitive to light. The film is color developed in a developer of the type set forth in Example I and prior to the completion of development the film is given an overall exposure through a "Wratten" No. 87 filter from the support side and through a filter pack comprising "Corning" Nos. 5130 and 9830 and "Wratten" Nos. 89 and 89A, which transmit light mainly in the region between 690 m$\mu$ and 730 m$\mu$, from the emulsion side prior to completion of color development. Development is continued for a total of 9 minutes and the film is washed, fixed, bleached, fixed, washed and dried after the manner set forth in Example I. Absorption of the cyan and magenta dye images and the unwanted green absorptions of the cyan dye image are all corrected.

*Example X*

A photographic film, as shown in Figure 25 of the drawing, comprises a cellulose acetate film 20 bearing in order on one surface a gelatin sublayer 21, a red-sensitive silver halide emulsion layer 60 containing a magenta color-former, as described in Example I, a low speed and highly transparent silver halide emulsion layer 61 sensitive to light above 750 m$\mu$ containing the yellow color-former of Example I, a low speed and highly transparent silver halide emulsion layer 62 having its maximum sensitivity of approximately 720 m$\mu$ containing yellow and magenta color-formers as described in layers 61 and 60, respectively, a green-sensitive silver halide emulsion layer 63 containing a cyan color-former as described in Example II, a yellow filter layer 64 of the type described in Example V and a blue-sensitive silver halide emulsion layer 65 containing a yellow color-former as in layer 61. The film is exposed and processed to multicolor dye images as in Example IX with similar results.

*Example XI*

A photographic film, as shown in Figure 26 of the drawing, comprises a cellulose acetate film 20 bearing in order on one surface a gelatin sublayer 21, a blue-sensitive silver halide emulsion layer 66 containing a magenta color-former as described in Example I, and an infrared sensitive Lippmann-type silver bromide emulsion layer 67 containing a yellow color-former as described in Example I. The film is first given an exposure of low intensity to light from the emulsion side (which exposes only the inner layer) and after being developed for 5 minutes at 70° F. in the color developer described in Example I is given an overall exposure through "Wratten" Nos. 88A and 2B filters from either the emulsion or base side, and development is continued for a period of 9 minutes and then the film is washed, fixed, bleached, fixed, washed and dried as described in Example I. Spectrophotometric curves of the magenta dye images of different densities of the film before and after color correction are similar to those of Figs. 2 and 3 respectively. As clearly indicated in the latter figures, the unwanted blue absorption of the magenta dye is well corrected.

*Example XII*

A photographic film, as shown in Figure 27 of the drawing, comprises a cellulose acetate film 20 bearing in order on one surface a gelatin sublayer 21, a red-sensitive silver halide emulsion layer 68 containing a cyan color-former as described in Example II, and an infra-red sensitive Lippmann-type silver bromide emulsion layer 69 containing a mixture of a yellow and a magenta color former as described in Example III. The film is first given an exposure of low intensity from the emulsion side (which exposes only the inner layer) and after being developed for 6 minutes at 70° F. in a color developer as described in Example I is given an overall exposure through "Wratten" Nos. 87 and 2B filters from the emulsion side and development is continued for a period of 9 minutes and then the film is washed, fixed, bleached, fixed, washed and dried as set forth in Example I. Spectrophotometric curves of the cyan dye image of different densities, before and after color correction, are similar to those shown in Figures 7 and 8, respectively. As clearly indicated, the unwanted blue and green absorption of the cyan dye is well corrected.

*Example XIII*

A photographic film, as shown in Figure 28 of the drawing, comprises a cellulose acetate film 20 bearing in order on one surface a gelatin sublayer 21, a low speed and low contrast silver halide emulsion layer having maximum sensitivity at about 720 m$\mu$ containing both a yellow and a magenta color-former as described in Example III, a red-sensitive silver halide emulsion layer 71 containing a cyan color-former as described in Example II, a green-sensitive silver halide emulsion layer 72 containing a yellow color-former as described in Example I, a yellow filter layer 73 as described in Example V, a blue-sensitive silver halide emulsion layer 74 containing a magenta color-former as described in Example I, and an infra-red sensitive Lippmann-type silver bromide emulsion layer 75 sensitive to light above 750 m$\mu$ containing a yellow color-former as in layer 72. The film is first given an exposure of low intensity to a multicolor object field which exposes all emulsion layers except layers 70 and 75, since they are slow in speed and not very sensitive to light. The film is color developed in a developer of the type set forth in Example I and prior to the completion of development the film is given an overall exposure through "Wratten" filters Nos. 88A and 2B from the emulsion side. Development is continued for a total of 9 minutes and the film is washed, fixed, bleached, fixed, washed and dried after the manner set forth in Example I. In Figures 29, 30, 31 and 32, there are shown spectrophotometric curves of cyan and magenta dye images of different densities before and after color correction by the above method. As evident from these curves, the unwanted blue absorption of the magenta dye and the unwanted blue and green absorptions of the cyan dye are well corrected.

*Example XIV*

A photographic film, as shown in Figure 33 of the drawing, comprises a cellulose acetate film 20 bearing in order on one surface a gelatin sublayer 21, a red-sensitive silver halide emulsion layer 76 containing a magenta color-former as described in Example I. An infra-red sensitive Lippmann-type silver bromide emulsion layer 77 containing a yellow color-former as described in Example I, a green-sensitive silver halide emulsion layer 78 containing a cyan color-former as described in Example II, an infra-red sensitive Lippmann-type silver bromide emulsion layer 79 containing the second magenta color-former as described in Example I, a yellow filter layer 80 as described in Example V, and a blue-sensitive silver halide emulsion layer 81 containing a yellow color-former as in layer 78. The film is first given an exposure of low intensity to a multicolor object field which exposes all emulsion layers except layers 77 and 79, since they are slow in speed and not very sensitive to light. The film is color developed in a developer of the type set forth in Example I and prior to the completion of development, the film is given an overall exposure through a "Wratten" filter No. 87C from the emulsion side. Development is continued for a total of 9 minutes and the film is washed, fixed, bleached, fixed, washed and dried after the manner set forth in Example I. In Figures 34, 35, 36 and 37 there are shown spectrophotometric curves of cyan and magenta dye images of different densities before and after color correction by the above method.

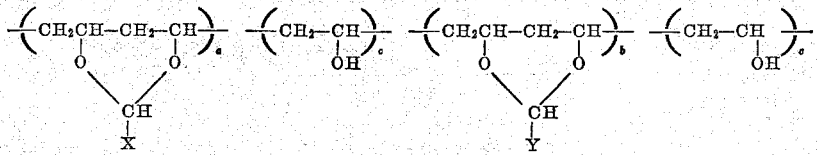

As evident from these curves, the unwanted blue absorption of the magenta dye and the unwanted blue and green absorptions of the cyan dye are well corrected.

In place of the specific immobile or non-diffusing color-formers described in the foregoing examples, which are essentially colorless compounds, various other color-formers having such properties can be substituted in the foregoing examples and analogous procedures with similar results. In these color-formers the color-forming nucleus has as the active color-coupling group a structure which may be represented by the formula:

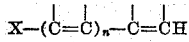

wherein X is HO— or RHN—, wherein R is hydrogen or an aliphatic group and $n$ is 0 or 1. Compounds of this type include phenolic or naphtholic compounds and aromatic primary or secondary amines with hydrogen or replaceable groups, e.g., halogen, carboxyl and sulfonic acid groups para to the hydroxyl and active methylene compounds such as acylacetarylides, cyanoacetyl compounds, pyrazolones and other heterocyclic active methylene-containing compounds. While these are the preferred color-formers, this invention works equally well with couplers and color developers that yield other types of dyes, for instance, the phenazonium and azine dyes as described in the following U.S. patents: Coles 2,524,725, Schmidt et al. 2,536,010 and 2,543,338, Tulagin et al. 2,524,741, 2,525,502, 2,525,503 and 2,591,642, and the dyes described in Jennen U.S. Patent 2,673,801.

Immobilization of these color-formers in the emulsion layers may be accomplished in a number of ways. For instance, high molecular weight substituents including alkyl chains of 12 or more carbon atoms and polycyclic groups may be attached to the color-formers to provide immobility in water-permeable colloid layers, as described in U.S. Patent 2,179,244 or the color-formers may be immobilized by dispersing in a non-aqueous phase as shown in U.S. Patent 2,272,191. One particularly useful method of immobilization involves the formation of color-forming polyvinyl acetals. These are essentially colorless synthetic polymers having colloid properties and containing a plurality of aliphatic hydroxyl groups usually vinyl alcohol units (—CH₂CHOH— groups) in the polymer chain together with acetal constituents containing both color-forming groups and solubilizing groups. Such polymers are described in more detail in U.S. Patent 2,310,943 and in the J. Am. Chem. Soc. 73, 4930 (1951).

While the preferred color-formers are polyvinyl acetals, other color-formers immobilized in other ways may be used, as for instance, color-formers containing other high molecular weight substituents including aliphatic chains of 12 or more carbon atoms and polycyclic groups, those substantive to gelatin or non-diffusing in gelatin or other colloids, or color-formers immobilized by being dispersed in a non-aqueous phase. The preferred color-formers are essentially colorless, synthetic polymers which have colloid properties and contain a plurality of aliphatic hydroxyl groups usually, vinyl alcohol units (—CH₂—CHOH— group)

in the polymer chain as the predominant hydrophilic group and have as an integral part of their molecular structure color-former nuclei of the foregoing structure. They also preferably contain solubilizing groups from acetalization with an aldehyde containing such a group, e.g., —SO₃Na and —CO₂Na. The general structure of these synthetic color-forming, water-permeable colloids may be represented as:

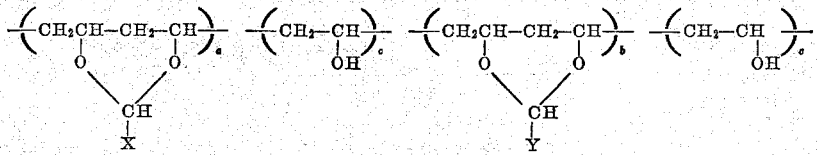

where X is a color-former group or nucleus and Y is a group enhancing hydrophilic character, and the numbers $a$, $b$ and $c$ are selected to contribute the desired degree of colloid properties and to provide the required color density after color-coupling development.

These color-formers when used in light-sensitive silver halide layers may constitute the sole binding agents for the silver halide grains or they can be mixed with polyvinyl alcohol, polyvinyl acetals or partially hydrolyzed polyvinyl esters which are water-soluble or hydrophilic in character and/or other natural or synthetic colloid binding agents for silver halide grains, including gelatin.

Similarly various other primary aromatic amino color-developing agents can be used in place of the specific one in the foregoing examples. Suitable additional ones are described in the British Journal of Photography, October 14, 1938, pages 647–648. These color-developing agents can be used in the form of their addition salts, e.g., hydrochlorides and hydrosulfates, which are more soluble and more stable than the free bases.

Various types of hydrophobic films can be used as the base film for the multilayer photographic elements described above. Suitable bases include cellulose derivatives, e.g., cellulose nitrate, cellulose acetate, cellulose acetate propionate, cellulose acetate butyrate; superpolymers, e.g., polyvinyl chloride, poly(vinyl chloride co vinyl acetate), and polyethylene terephthalate. The known anchoring sublayers which are useful with such bases can be used to anchor the silver halide emulsion layers to the bases.

The supplementary exposure is most simply carried out during color development. However, if desired, the development can be stopped by washing the film and drying, then giving the supplementary exposure and completing development and processing.

This invention is, of course, not limited to camera negative films but may be applied equally well to any multilayer color transparency from which copies, prints, duplicates, or other reproductions in color are to be made. Thus the color values in any multilayer color camera negative, master positive, duplicating negative, or other intermediate film may be improved by use of this invention.

The novel processes of color correction as set forth above are not limited to the use of the specific film structure given above but are applicable to other film structures. Although certain film structures are more suitable for obtaining optimum color correction by this invention, some degree of color correction can be obtained in any multilayer film which can be exposed during color development to form a correcting image opposite in sign to an image dye which has inadequate spectral transmission and in a dye whose maximum spectral absorption occurs where the image dye absorbs improperly. A degree of correction can be achieved in many multilayer films when the correct supplemental exposure is given. However, the advantage in using films containing auxiliary layers is that the sensitivity of such emulsions can be so selected that the supplementary exposure does not affect the principal image emulsion, thus making control of sensitometry in the film much more accurate.

Another advantage of the invention is that it provides new film structures and a method of processing which can be readily operated to yield multicolor images of nearly ideal color values.

The invention has the additional advantage in that it provides a practical and effective process for correcting the undesirable absorption of quinoneimine and azomethine dye images in the reproduction of original developed multicolor images.

The embodiments of the invention in which an exclusive property or privilege is claimed are defined as follows:

1. A multilayer photographic color film comprising a transparent film base bearing (1) three fast-speed silver halide layers and a yellow filter layer which are so disposed and sensitized that each silver halide layer is essentially sensitive to a different primary color region of the visible spectrum and insensitive to light of wavelength greater than 700 m$\mu$ and contains a non-diffusing color former having at least one color-forming nucleus containing an active color-coupling group and capable of forming a subtractive dye image during chromogenic development of a latent silver image with a primary aromatic amine color developing agent which dye image is essentially complementary in color to one of the primary colors and has unwanted absorption in at least one other primary color region of the visible spectrum and (2) at least one auxiliary slow-speed silver halide layer primarily sensitive to light of greater wavelength than 700 m$\mu$, relatively insensitive to light of lesser wavelength than 700 m$\mu$ and being of such speed and contrast that upon image-forming exposure of the fast-speed layers no image occurs in the auxiliary layer, said auxiliary layer being disposed adjacent one of said fast-speed layers and containing a non-diffusing color former of the aforesaid type which is capable during the aforesaid development of yielding a masking dye image of an aforesaid dye having spectral absorption characteristics in a region of unwanted absorption of one of said dyes of complementary color.

2. A multilayer film as set forth in claim 1 wherein said color formers are polyvinyl acetals having a plurality of lateral color-forming nuclei.

3. A multilayer color film comprising a transparent film base bearing on one surface, in order, an auxiliary slow-speed infrared light-sensitive silver halide emulsion layer primarily sensitive to light of greater wavelength than 700 m$\mu$, relatively insensitive to light of lesser wavelength than 700 m$\mu$ and containing non-diffusing magenta and yellow color formers, a fast-speed red-sensitive layer containing a non-diffusing cyan color former, a fast-speed green-sensitive silver halide emulsion layer insensitive to light of wavelength greater than 700 m$\mu$ containing a non-diffusing yellow color former, a yellow filter layer, and a fast-speed blue-sensitive silver halide emulsion layer insensitive to light of wavelength greater than 700 m$\mu$ containing a non-diffusing magenta color former, said auxiliary layer being of such speed and contrast that upon image-forming exposure of the fast-speed layers no image occurs in the auxiliary layer, said color formers having at least one color-forming nucleus containing an active color-coupling group capable of forming a subtractive dye image during chromogenic development of a latent silver image with a primary aromatic amine color-developing agent.

4. A multilayer color film comprising a transparent film base bearing on one surface, in order, an auxiliary slow-speed infrared-sensitive silver halide emulsion layer primarily sensitive to light of greater wavelength than 700 m$\mu$, relatively insensitive to light of lesser wavelength than 700 m$\mu$ and containing a non-diffusing yellow color former, a fast-speed red-sensitive silver halide layer insensitive to light of wavelength greater than 700 m$\mu$ containing a non-diffusing magenta color former, a fast-speed green-sensitive silver halide emulsion layer insensitive to light of wavelength greater than 700 m$\mu$ containing a non-diffusing yellow color former, a yellow filter layer and a fast-speed blue-sensitive silver halide emulsion layer insensitive to light of wavelength greater than 700 m$\mu$ containing a non-diffusing cyan color former, said auxiliary layer being of such speed and contrast that upon image-forming exposure of the fast-speed layers no image occurs in the auxiliary layer, said color formers having at least one color-forming nucleus containing an active color-coupling group capable of forming a subtractive dye image during chromogenic development of a latent silver image with a primary aromatic amine color-developing agent.

5. A multilayer color film comprising a transparent film base bearing on one surface, in order, a fast-speed red-sensitive silver halide emulsion layer insensitive to light of wavelength greater than 700 m$\mu$ containing a non-diffusing cyan color former, an auxiliary slow-speed far-red-sensitive silver halide emulsion layer containing non-diffusing yellow and magenta color formers, a fast-speed green-sensitive silver halide emulsion layer insensitive to light of wavelength greater than 700 m$\mu$ containing a non-diffusing yellow color former, an auxiliary slow-speed infrared-sensitive silver halide emulsion layer primarily sensitive to light of greater wavelength than 700 m$\mu$ containing a non-diffusing yellow color former, a yellow filter layer, and a fast-speed blue-sensitive silver halide emulsion layer insensitive to light of wavelength greater than 700 m$\mu$ containing a non-diffusing magenta color former, said auxiliary layers being primarily sensitive to light of greater wavelength than 700 m$\mu$ and relatively insensitive to light of lesser wavelength than 700 m$\mu$ and being of such speed and contrast that upon image-forming exposure of the fast-speed layers no image occurs in the auxiliary layers said color formers having at least one color-forming nucleus containing an active color-coupling group capable of forming a subtractive dye image during chromogenic development of a latent silver image with a primary aromatic amine color-developing agent.

6. A multilayer color film comprising a transparent film base bearing on one surface, in order, a fast-speed red-sensitive silver halide emulsion layer insensitive to light of wavelength greater than 700 m$\mu$ containing a non-diffusing magenta color former, an auxiliary slow-speed infrared-sensitive silver halide emulsion layer primarily sensitive to light of greater wavelength than 700 m$\mu$ containing a non-diffusing yellow color former, a fast-speed green-sensitive silver halide emulsion layer insensitive to light of wavelength greater than 700 m$\mu$ containing a non-diffusing cyan color former, an auxiliary slow-speed infrared-sensitive silver halide emulsion layer containing a non-diffusing magenta color former, a yellow filter layer, and a fast-speed blue-sensitive silver halide emulsion layer insensitive to light of wavelength greater than 700 m$\mu$ containing a non-diffusing yellow color former, said auxiliary layers being primarily sensitive to light of greater wavelength than 700 m$\mu$ and relatively insensitive to light of lesser wavelength than 700 m$\mu$ and being of such speed and contrast that upon image-forming exposure of the fast-speed layers no image occurs in the auxiliary layers said color formers having at least one color-forming nucleus containing an active color-coupling group capable of forming a subtractive dye image during chromogenic development of a latent silver image with a primary aromatic amine color-developing agent.

7. A process which comprises exposing to a multi-color object field a multilayer photographic color film comprising a transparent film base bearing (1) three fast-speed silver halide layers and a yellow filter layer which are so disposed and sensitized that each silver halide layer is essentially sensitive to a different primary color region of the visible spectrum and insensitive to light of wavelength greater than 700 m$\mu$ and contains a non-diffusing color former having at least one color former nucleus containing an active color-coupling group and being capable of forming a subtractive dye image during chromogenic development of a latent silver image with a color developing agent which dye image is essentially complementary in color to one of the primary colors and has unwanted absorption in at least one other primary color region of the visible spectrum and (2) at least one auxiliary slow-speed silver halide layer primarily sensitive to light of greater wavelength than 700 m$\mu$, relatively insensitive to light of lesser wavelength than 700 m$\mu$ and being of such speed and contrast that upon image-forming exposure of the fast-speed layers no image occurs in the auxiliary layer, said auxiliary layer being disposed adjacent one of said fast-speed layers and containing a non-diffusing color former of the aforesaid type which is capable of yielding a masking dye image of an aforesaid dye having spectral absorption characteristics in a region of unwanted absorption of one of said dyes of complementary color, developing said exposed film in a developer solution containing a primary aromatic amine color developing agent and, prior to the completion of said color development and while said exposed film is in contact with said primary aromatic amine color developing agent to form dye images in the fast-speed layers, giving the film a supplemental overall exposure to light of wavelengths greater than 700 m$\mu$ for such a period that no significant exposure occurs in said fast-speed layers and continuing the development to form a silver image and a subtractive dye masking image having a contrast 10 to 30% that of a dye image formed in said fast-speed layers and removing the silver and silver salts from the resulting film element.

References Cited in the file of this patent

UNITED STATES PATENTS

| | | |
|---|---|---|
| 2,258,187 | Mannes et al. | Oct. 7, 1941 |
| 2,348,735 | Gaspar | May 16, 1944 |
| 2,393,756 | Dearing | Jan. 29, 1946 |
| 2,403,722 | Jelley et al. | July 9, 1946 |
| 2,571,698 | Fierke | Oct. 16, 1951 |
| 2,661,293 | Land | Dec. 1, 1953 |
| 2,694,008 | Berger et al. | Nov. 9, 1954 |

FOREIGN PATENTS

| | | |
|---|---|---|
| 912,605 | France | Apr. 29, 1946 |